(12) United States Patent
Takeuchi et al.

(10) Patent No.: US 10,007,740 B2
(45) Date of Patent: *Jun. 26, 2018

(54) PATTERN MATCHING BASED CHARACTER STRING RETRIEVAL

(71) Applicant: International Business Machines Corporation, Armonk, NY (US)

(72) Inventors: Emiko Takeuchi, Tokyo (JP); Daisuke Takuma, Tokyo (JP); Hirobumi Toyoshima, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/715,301

(22) Filed: Sep. 26, 2017

(65) Prior Publication Data

US 2018/0018405 A1 Jan. 18, 2018

Related U.S. Application Data

(63) Continuation of application No. 14/629,589, filed on Feb. 24, 2015, now Pat. No. 9,785,726.

(30) Foreign Application Priority Data

Feb. 25, 2014 (JP) .................................. 2014-033845

(51) Int. Cl.
   *G06F 17/30* (2006.01)
(52) U.S. Cl.
   CPC .. *G06F 17/30985* (2013.01); *G06F 17/30539* (2013.01); *G06F 2207/025* (2013.01)
(58) Field of Classification Search
   CPC ......... G06F 17/30985; G06F 17/30539; G06F 2207/025
   See application file for complete search history.

(56) References Cited

U.S. PATENT DOCUMENTS 5,148,367 A   9/1992  Saito et al.
6,018,736 A   1/2000  Gilai et al.
           (Continued)

FOREIGN PATENT DOCUMENTS

JP   H10177581 A   6/1998
JP   H10334102 A   12/1998
           (Continued)

OTHER PUBLICATIONS

Notification of Reasons for Refusal, Japan Application No. 2014-033845, dated Feb. 9, 2016, 3 pgs.
           (Continued)

*Primary Examiner* — Jorge A Casanova
(74) *Attorney, Agent, or Firm* — Jared L. Montanaro

(57) ABSTRACT

Embodiments relate to generating a retrieval condition for retrieving a target character string from texts by pattern matching. An aspect includes dividing a first text into words. Another aspect includes generating a converted character string by performing at least one of appending at least one character in at least either one of previous and subsequent positions of the target character string. Another aspect includes replacing at least one character of the target character string. Another aspect includes generating the retrieval condition for retrieval candidates in the words of the first text, the retrieval condition comprising determining that a retrieval candidate matches the target character string and does not match the converted character string based on a ratio of a part of the retrieval candidate which matches the converted character string and corresponds to the target character string is less than or equal to a reference frequency.

1 Claim, 5 Drawing Sheets

(56) References Cited

U.S. PATENT DOCUMENTS

| | | |
|---|---|---|
| 7,853,578 B1 | 12/2010 | Anker et al. |
| 2007/0040813 A1 | 2/2007 | Kushler et al. |
| 2007/0260602 A1 | 11/2007 | Taylor |
| 2009/0284471 A1 | 11/2009 | Longe et al. |
| 2010/0138376 A1 | 6/2010 | Avis et al. |
| 2012/0268381 A1 | 10/2012 | Unruh |
| 2015/0242537 A1 | 8/2015 | Takeuchi et al. |
| 2017/0053039 A1 | 2/2017 | Takeuchi et al. |

FOREIGN PATENT DOCUMENTS

| | | | |
|---|---|---|---|
| JP | 2001034623 A | 2/2001 |
| JP | 2002297660 A | 10/2002 |
| JP | 3464055 B2 | 11/2003 |
| JP | 2006318225 A | 11/2006 |
| JP | 2007041683 A | 2/2007 |
| JP | 2007164635 A | 6/2007 |
| JP | 2008095982 A | 4/2008 |
| JP | 2008102765 A | 5/2008 |
| JP | 4143085 B2 | 9/2008 |
| JP | 2010177581 A | 8/2010 |
| WO | 0150343 A1 | 7/2001 |

OTHER PUBLICATIONS

Written Argument, Japan Application No. 2014-033845, translated Jun. 9, 2016, 3 pgs.

Decision to Grant a Patent, Japan Application No. 2014-033845, dated Mar. 24, 2016, 6 pgs., original and translated versions.

List of IBM Patents or Patent Applications Treated as Related, Sep. 22, 2017, 2 pgs.

Takeuchi et al., "Information Processing Device, Method, and Program," Japan Application No. 2014-033845, filed Feb. 25, 2014, 51 pgs., (English translation).

Takeuchi et al., "Pattern Matching Based Character String Retrieval," U.S. Appl. No. 15/715,330, filed Sep. 26, 2017.

Okazaki et al., "Simple and Efficient Algorithm for Approximate Dictionary Matching," 2010, Proceedings of the 23rd International Conference on Computational Linguistics, pp. 851-859.

| EXCLUSION CANDIDATE | TARGET CHARACTER STRING | EXCLUSION CANDIDATE |
|---|---|---|
| ☐ YUU-HATSU-SEI (INDUCED) | | ☑ YUU-HATSU-SEI (INDUCED) |
| ☐ GATA (TYPE) | | ☑ KEN-SHIN (MEDICAL EXAMINATION) |
| ☐ GA | GA-N (CANCER) | ☐ NO (OF) |
| ☐ NO (OF) | | ☐ NO-UTAGA-I (SUSPICION OF) |
| ☐ KARA (FROM) | | ☐ WO |

32

| TX1 | ········ GA-N-WA (CANCER IS) ········ . |
| --- | --- |
| TX2 | ········YUU-HATSU-SEI-GA-N-WA (INDUCED CANCER IS) ········ . |
| TX3 | ········ SU-KI-RU-SU-I-GA-N-WA (SCIRRHUS STOMACH CANCER IS) ········ . |
| TX4 | ········ GA-N-NO (OF CANCER) ········ . |
| TX5 | ········ GA-N-YUU-HATSU-SEI-TAI-JUU-GEN-SYOU-DE (BY CANCER-INDUCED WEIGHT LOSS) ········ . |
| TX6 | ········ GA-N-KEN-SHIN-DE (IN CANCER MEDICAL EXAMINATION) ········ . |
| TX7 | ················································ . |

| TX11 | ········ EN-SHOU-YUU-HATSU-SEI-GA-N-WA, (INFLAMMATORY-INDUCED CANCER IS) ········ . |
| --- | --- |

•
•
•

| TX21 | ········ GA-N-YUU-HATSU-SEI-KOTSU-TUU-NI (TO CANCER-INDUCED OSTEOCOPIC PAIN) ········ . |
| --- | --- |

•
•
•

| TX31 | ········ GA-N-KEN-SHIN-DE (IN CANCER MEDICAL EXAMINATION) ········ . |
| --- | --- |

FIG. 6

PATTERN MATCHING BASED CHARACTER STRING RETRIEVAL

BACKGROUND

The present disclosure relates generally to information processing, and more specifically, to pattern matching based character string retrieval.

An information processing device may extract character strings from a database that stores character strings, and then exclude some of the extracted character strings. For example, an information processing device may extract some character strings such as, for example, "development cost," "cost," and "development" from a database of character strings in which text is organized in records. Thereafter, the device may delete "development cost", which overlaps "development", and "cost", and creates a new database including character strings "development" and "cost." However, a lot of required character strings may be incorrectly excluded since the information processing device excludes character strings composed of some of a plurality of extracted character strings, in other words, combined words composed of a plurality of character strings, and therefore character strings which should be extracted are not extracted, which may lead to retrieval only being allowed under retrieval conditions with low accuracy of extracting character strings.

SUMMARY

Embodiments relate to generating a retrieval condition for retrieving a target character string from texts by pattern matching. An aspect includes dividing a first text into words. Another aspect includes generating a converted character string by performing at least one of appending at least one character in at least either one of previous and subsequent positions of the target character string. Another aspect includes replacing at least one character of the target character string. Another aspect includes generating the retrieval condition for retrieval candidates in the words of the first text, the retrieval condition comprising determining that a retrieval candidate matches the target character string and does not match the converted character string based on a ratio of a part of the retrieval candidate which matches the converted character string and corresponds to the target character string is less than or equal to a reference frequency.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

Various embodiments will now be described, by way of example only, with reference to the following drawings in which:

FIG. 5 illustrates an embodiment of a targeted text corpus for retrieval.

FIG. 6 illustrates an embodiment of a text corpus including a third text used for the generation of a retrieval condition.

DETAILED DESCRIPTION

Embodiments of pattern matching based character string retrieval are disclosed herein, with exemplary embodiments being discussed below in detail. According to an embodiment, there is provided an information processing device which generates a retrieval condition for retrieving a target character string from texts by pattern matching, the device comprising: a language processing unit which divides a first text into words by language processing; a character conversion unit which generates a converted character string by performing at least one of appending at least one character in at least either one of previous and subsequent positions of the target character string and replacing at least one character of the target character string; and a condition generation unit which generates the retrieval condition of matching the target character string and not matching the converted character string on condition that the ratio of a part which matches the converted character string and corresponds to the target character string among the words divided by the language processing is equal to or less than a reference frequency in the first text. According an embodiment, there is provided a method for the information processing device. Furthermore, according to an embodiment, there is provided a computer program product for the information processing device.

Figure 1:
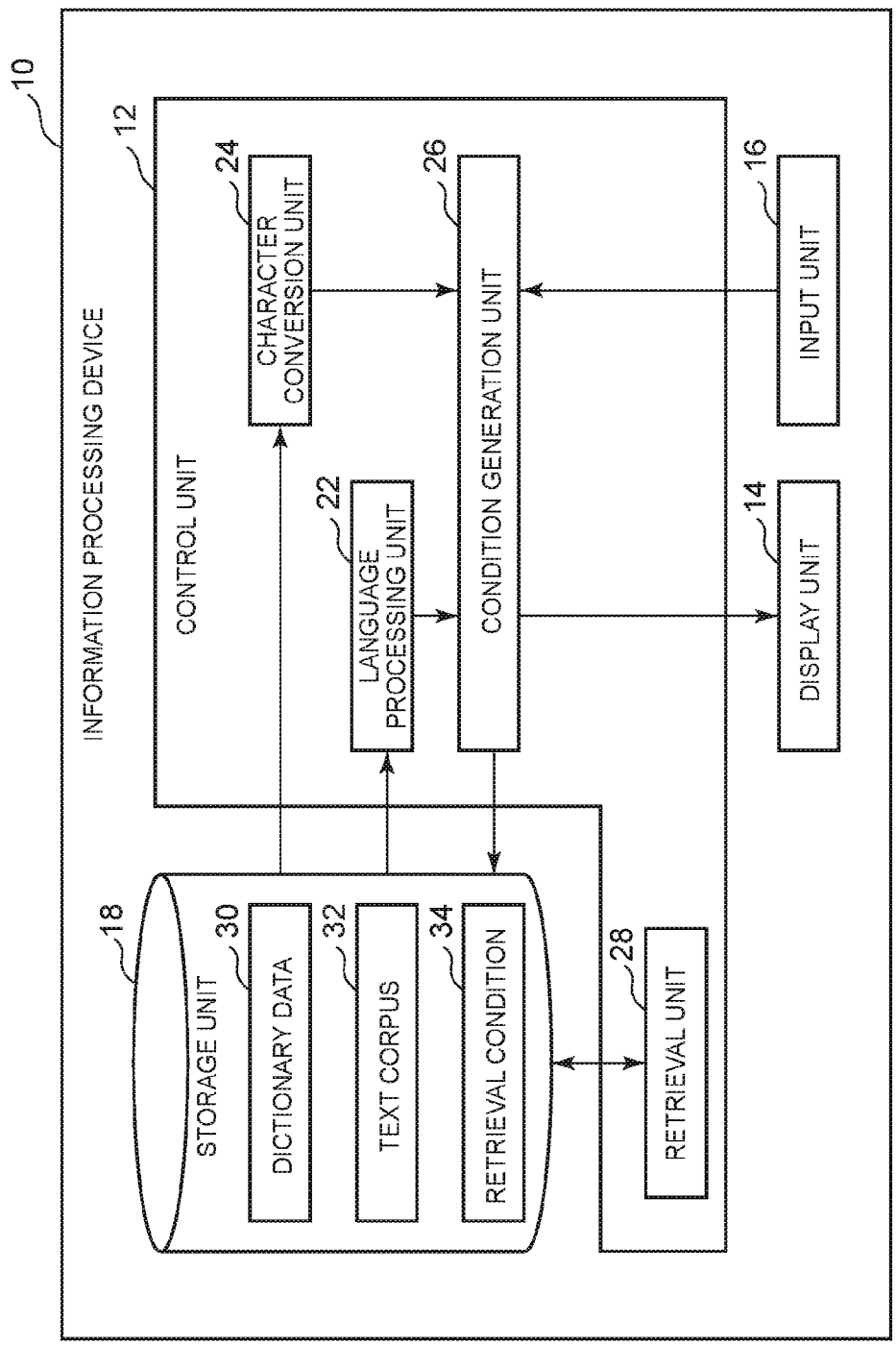
FIG. 1 illustrates an embodiment of an information processing device.

FIG. 1 illustrates an embodiment of an information processing device 10. The information processing device 10 generates a retrieval condition 34 for an accurate extraction of words of a target character string to be retrieved by language processing through character string retrieval. An example of the information processing device 10 is a computer such as a personal computer or the like.

The information processing device 10 includes a control unit 12, a display unit 14, an input unit 16, and a storage unit 18. Instead, without including any one of the display unit 14, the input unit 16, and the storage unit 18, the information processing device 10 may use a display unit 14, an input unit 16, or a storage unit 18 provided in an external device.

The control unit 12 is an arithmetic processing unit such as a central processing unit (CPU). The control unit 12 includes a language processing unit 22, a character conversion unit 24, a condition generation unit 26, and a retrieval unit 28. For example, the control unit 12 may be configured to function as the language processing unit 22, the character conversion unit 24, the condition generation unit 26, and the retrieval unit 28 by reading a program for retrieval condition generation processing and a program for retrieval processing from the storage unit 18 or via a network. In addition, some or all of the language processing unit 22, the character conversion unit 24, the condition generation unit 26, and the retrieval unit 28 may be composed of hardware such as circuits or the like.

The language processing unit 22 divides a first text into words by language processing. For example, the language processing unit 22 is connected to the storage unit 18 and to the condition generation unit 26. The language processing unit 22 acquires one or more first texts included in a text corpus 32 for learning stored in the storage unit 18 and divides the first text concerned into words by language processing. The language processing unit 22 may divide the first text into words on the basis of a morphological analysis using words and a grammar registered in dictionary data 30. The language processing unit 22 outputs the first text divided into words to the condition generation unit 26.

The character conversion unit 24 appends at least one character in at least either one of the previous and subsequent positions of a target character string to generate a converted character string. For example, the character conversion unit 24 is connected to the storage unit 18 and to the condition generation unit 26. The character conversion unit 24 generates a converted character string, in which at least one character is appended in either one of the previous and subsequent positions of the target character string, on the basis of the words acquired from the dictionary data 30 in the storage unit 18. The character conversion unit 24 outputs the target character string, the converted character string, and the like to the condition generation unit 26.

The condition generation unit 26 is connected to the language processing unit 22, the character conversion unit 24, and the storage unit 18. The condition generation unit 26 acquires the first text, which has been divided into words, from the language processing unit 22. The condition generation unit 26 acquires the target character string and the converted character string from the character conversion unit 24. The condition generation unit 26 generates a retrieval condition 34 of matching the target character string and not matching the converted character string on condition that the ratio of a part which matches the converted character string and corresponds to the target character string among the words divided by the language processing is equal to or less than a reference frequency in the first text. This enables the condition generation unit 26 to generate the retrieval condition 34 for retrieving the target character string by character string retrieval and for retrieving words including a converted character string to be distinguished as a different word. The condition generation unit 26 causes the storage unit 18 to store the generated retrieval condition 34. The condition generation unit 26 outputs image information of a display image including an exclusion candidate, which is a candidate not to be matched with the converted character string, to the display unit 14.

The retrieval unit 28 retrieves a text on the basis of the retrieval condition 34 generated by the condition generation unit 26. For example, the retrieval unit 28 retrieves a text including a character string matching the retrieval condition 34 within the text corpus 32 and extracts the text.

The display unit 14 displays an image on the basis of the image information obtained from the condition generation unit 26 of the control unit 12. An example of the display unit 14 is an organic electroluminescent (EL) display device or a liquid crystal display device.

The input unit 16 accepts an input from a user and outputs it to the control unit 12. An example of the input unit 16 is a keyboard, a mouse, a touch panel, or the like.

The storage unit 18 stores programs executed by the control unit 12 and required information such as parameters or the like in the execution of the programs. For example, the storage unit 18 stores the program for retrieval condition generation processing and the program for retrieval processing. The storage unit 18 stores the dictionary data 30 and the text corpus 32 that is used to execute the program for retrieval condition generation processing and the program for retrieval processing. The dictionary data 30 may be, for example, data in a Japanese dictionary or may be dictionary data of medical or other technical terminology. The text corpus 32 may be, for example, a database including general texts or may be a database including texts in medical or other specific fields. An example of a text in the medical field is a sentence described in an insurance application form.

Figure 2:
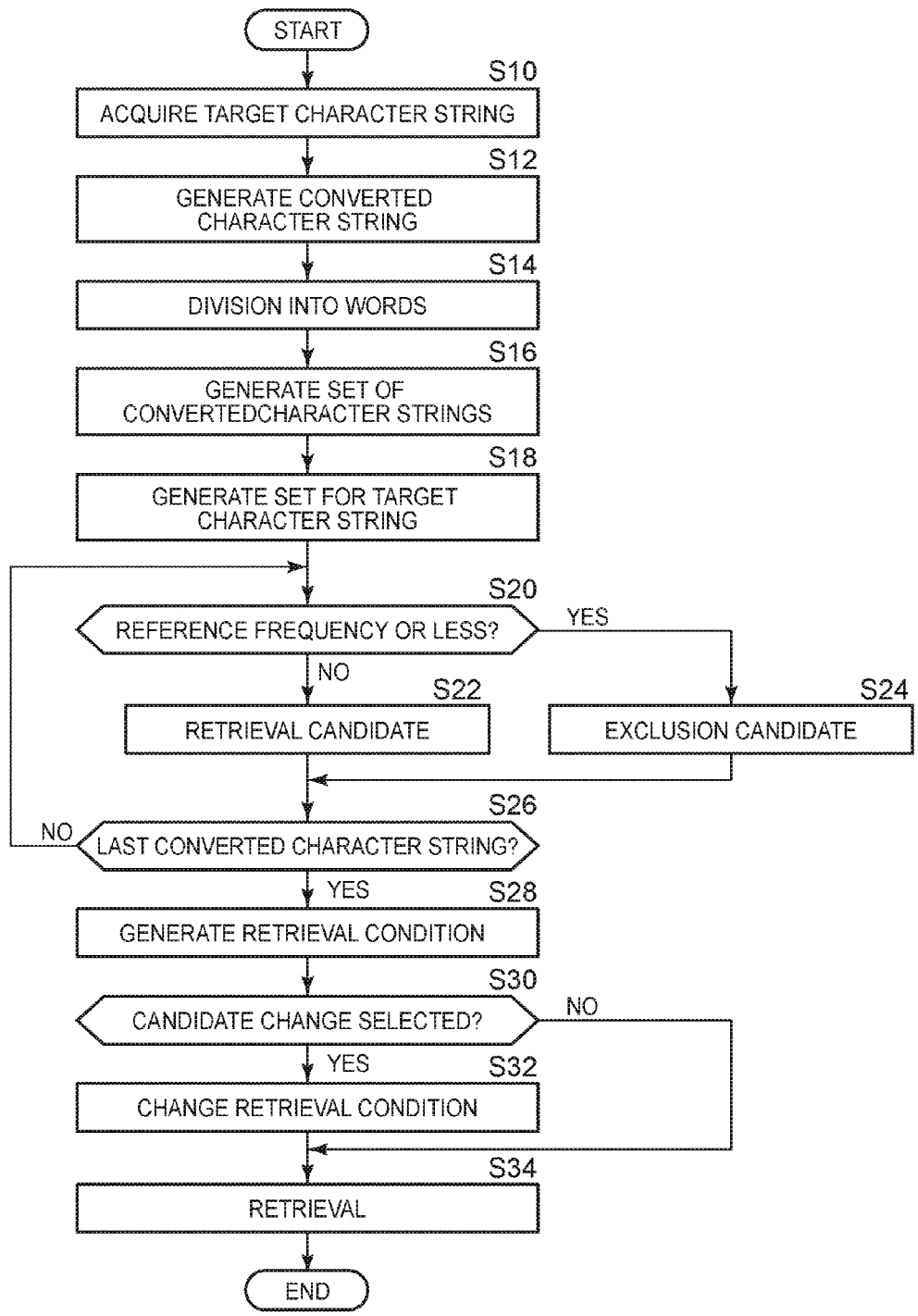
FIG. 2 illustrates an embodiment of flowchart of retrieval condition generation processing and retrieval processing performed by an information processing device.
Figures 3, 4:
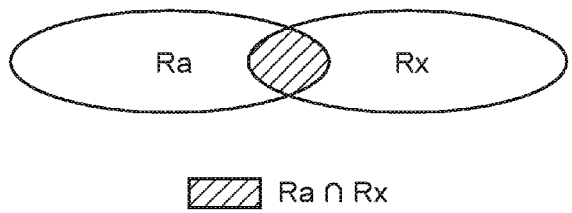
FIG. 3 illustrates an example of a Venn diagram describing the generation of a retrieval condition.
FIG. 4 illustrates an embodiment of a display image for selecting exclusion candidates.

FIG. 2 is a flowchart of an embodiment of a retrieval condition generation processing and retrieval processing performed by the information processing device 10. FIG. 3 is a Venn diagram that illustrates the generation of the retrieval condition 34. FIG. 4 is a diagram illustrating a display image 40 for selecting exclusion candidates. FIG. 5 is a diagram illustrating a targeted text corpus 32 for retrieval. The control unit 12 performs the retrieval condition generation processing and the retrieval processing by reading the program for retrieval condition generation processing and the program for retrieval processing. In this embodiment, a target character string to be retrieved is assumed to be "ga-n" (cancer, in Japanese).

As illustrated in FIG. 2, in the retrieval condition generation processing, first, the character conversion unit 24 acquires a target character string (block S10). For example, the character conversion unit 24 acquires a target character string from the words registered in the dictionary data 30 stored in the storage unit 18. The character conversion unit 24 may acquire a target character string through a user's input from a keyboard or the like.

The character conversion unit 24 generates a converted character string by appending at least one character in at least either one of the previous and subsequent positions of the target character string (block S12). For example, the character conversion unit 24 retrieves a word partially including the target character string from the words registered in the dictionary data 30 used for language processing and generates a converted character string by appending at least one character located in at least either one of the previous and subsequent positions of the target character string with respect to the retrieved word concerned. Furthermore, the character conversion unit 24 may generate a converted character string by appending at least one character, which is common to words whose number is greater than or equal to a predetermined reference number of words Sta among a plurality of words partially including the target character string in the dictionary data 30 used for language processing, to the target character string.

The following illustrates an embodiment of the generation of the converted character string performed by the character conversion unit 24 by using specific examples. It is assumed that the character conversion unit 24 extracts words "ga-n" (cancer), "yuu-hatsu-sei-ga-n" (induced cancer), "yuu-hatsu-sei-ga-n" (induced cancer), "ga-n-yuu-hatsu-sei" (cancer-induced), "ga-n-yuu-hatsu-sei" (cancer-induced), "ga-n-ken-shin" (cancer medical examination), "ga-n-ken-shin" (cancer medical examination), and "ga-n-sai-bou" (cancer cell) as a result of retrieving words including a target character string "ga-n" (cancer) from the dictionary data 30. The words may be extracted from entries (namely, headwords) of the dictionary data 30.

For example, the character conversion unit 24 counts the number of character strings "sei-ga-n" in which one character is added to the target character string "ga-n" (cancer) in the previous position thereof in the word "yuu-hatsu-sei-ga-n" (induced cancer). The dictionary data 30 contains the words "yuu-hatsu-sei-ga-n" (induced cancer) and "yuu-hatsu-sei-ga-n" (induced cancer) and therefore the character conversion unit 24 counts the number of character strings "sei-ga-n" as two. Here, the reference number of words Sta is set to two. The number of character strings "sei-ga-n" is greater than or equal to the reference number of words Sta, and therefore the character conversion unit 24 further counts the number of character strings "hatsu-sei-ga-n" in which one character is added in the previous position of the character string "sei-ga-n" of the word "yuu-hatsu-sei-ga-n" (induced cancer). The number of character strings "hatsu-sei-ga-n" is two in the same manner and greater than or equal to the reference number of words Sta. Therefore, the character conversion unit 24 further counts the number of character strings "yuu-hatsu-sei-ga-n" (induced cancer). The number of character strings "yuu-hatsu-sei-ga-n" (induced cancer) is also two and greater than or equal to the reference number of words Sta. Therefore, the character conversion unit 24 counts the number of character strings "yuu-hatsu-sei-ga-n" (induced cancer). A word including "yuu-hatsu-sei-ga-n" (induced cancer) is only "yuu-hatsu-sei-ga-n" (induced cancer), and therefore the character conversion unit 24 counts the number of the character strings concerned as one. The number of character strings is less than the reference number of words Sta and therefore the character conversion unit 24 does not consider the character string "yuu-hatsu-sei-ga-n" (induced cancer) as a converted character string.

On the other hand, since "yuu-hatsu-sei-ga-n" (induced cancer) satisfies the condition that "the number of character strings is greater than or equal to the reference number of words Sta, the character conversion unit 24 considers the character string "yuu-hatsu-sei-ga-n" (induced cancer) as a converted character string. In other words, the character conversion unit 24 appends three characters "yuu-hatsu-sei" (induced) in the previous position of the target character string "ga-n" to generate a converted character string "yuu-hatsu-sei-ga-n" (induced cancer). Here, the character conversion unit 24 considers one or more characters appended to the target character string to be a retrieval candidate. The retrieval candidate in this specification is the longest character string "yuu-hatsu-sei" (induced) among the characters whose number is greater than or equal to the reference number of words Sta appended to the target character string "ga-n" (cancer). The character conversion unit 24 enables the discrimination between the previous position and the subsequent position of the target character string where the retrieval candidate is appended to the target character string.

Similarly, the character conversion unit 24 counts the number of character strings "ga-n-yuu" in which one character is added in the subsequent position of the target character string "ga-n" (cancer) in the word "ga-n-yuu-hatsu-sei" (cancer-induced) in the dictionary data 30. The number of the character strings concerned is counted as two, which is greater than or equal to the reference number of words Sta, based on the word "ga-n-yuu-hatsu-sei" (cancer-induced) and the word "ga-n-yuu-hatsu-sei" (cancer-induced). Thereafter, the character conversion unit 24 performs the same processing as the above to generate a character string "ga-n-yuu-hatsu-sei" (cancer-induced) as a converted character string and to consider the character string "yuu-hatsu-sei" (induced) as a retrieval candidate. Similarly, the character conversion unit 24 generates a character string "ga-n-ken-shin" (cancer medical examination) as a converted character string from the word "ga-n-ken-shin" (cancer medical examination) and the word "ga-n-ken-shin" (cancer medical examination) in the dictionary data 30 and considers the character string "ga-n-ken-shin" (cancer medical examination) as a retrieval candidate.

On the other hand, a character string "ga-n-sai" in which one character is added in the subsequent position of the target character string "ga-n" (cancer) in the word "ga-n-sai-bou" (cancer cell) in the dictionary data 30 does not overlap other words. Therefore, the character conversion unit 24 counts the number of character strings concerned as one and determines that the number is less than the reference number of words Sta. Therefore, the character conversion unit 24 does not generate the word "ga-n-sai" as a converted character string.

The character conversion unit 24 outputs the converted character string, the target character string, and the retrieval candidate to the condition generation unit 26.

The language processing unit 22 divides the first text into words by language processing (block S14). For example, the language processing unit 22 acquires one or more first texts from the text corpus 32 stored in the storage unit 18. The language processing unit 22 divides the acquired first texts into words on the basis of the words already registered in the dictionary data 30 stored in the storage unit 18. The language processing unit 22 outputs one or more first texts divided into words to the condition generation unit 26.

The condition generation unit 26 generates a set, which is illustrated in FIG. 3, of converted character strings included in the first texts (block S16). For example, the condition generation unit 26 retrieves a part matching the converted character string included in the first texts, in other towards, a part coincident with the converted character string as a matter of the character string without regard for the division into words by the language processing unit 22 by character string retrieval and extracts the coincident parts. Therefore, the condition generation unit 26 retrieves and extracts all parts matching the converted character string in the first texts.

The condition generation unit 26 generates a set of words coincident with the target character string among the words into which the first texts are divided by the language processing (block S18). Specifically, the condition generation unit 26 retrieves and extracts a part coincident with the target character string in the first texts divided into words by the language processing unit 22 and then generates the set illustrated in FIG. 3.

The condition generation unit 26 determines whether the ratio of a part which matches the converted character string and corresponds to the target character string among the words divided by the language processing in the first text satisfies the condition of the reference frequency or less (block S20). For example, the condition generation unit 26 determines whether the ratio of a part which matches the converted character string satisfies the condition of the reference frequency or less, among the parts corresponding to the target character string in the words divided by the language processing in the first texts. The reference frequency is a numerical value between 0 and 1 such as, for example, 0.5. Specifically, the condition generation unit 26 determines whether the following expression (1) is satisfied, wherein Th is the reference frequency, Ra is the set of converted character strings, and Rx is the set of words:

$$Th \geq \#(Ra \cap Rx)/\#rx \qquad (1)$$

(Ra∩Rx) indicated by hatching as illustrated in FIG. 3 is an overlapping area between the set Ra and the set Rx. The symbol # indicates the number of character strings or words in the set.

If determining that the expression (1) is not satisfied, specifically, that the ratio of the part which matches the converted character string and corresponds to the target character string among the words divided by the language processing is greater than the reference frequency (block S20: No), the condition generation unit 26 maintains the retrieval candidate included in the converted character string as a retrieval candidate (block S22). For example, if determining that the converted character string "yuu-hatsu-sei-ga-n" (induced cancer) does not satisfy the expression (1), the condition generation unit 26 maintains the retrieval candidate "yuu-hatsu-sei" (induced) as a retrieval candidate.

On the other hand, if determining that the expression (1) is satisfied, specifically, that the ratio of the part which matches the converted character string and corresponds to the target character string among the words divided by the language processing is equal to or less than the reference frequency (block S20: Yes), the condition generation unit 26 considers the retrieval candidate included in the converted character string as an exclusion candidate (block S24). For example, if determining that the converted character string "ga-n-yuu-hatsu-sei" (cancer-induced) satisfies the expression (1), the condition generation unit 26 changes the retrieval candidate "yuu-hatsu-sei" (induced) to an exclusion candidate. In this embodiment, it is assumed that the converted character string "ga-n-ken-shin" (cancer medical examination) does not satisfy the expression (1), either, and the retrieval candidate "ken-shin" (medical examination) is also changed to an exclusion candidate.

The condition generation unit 26 determines whether the determined converted character string is the last converted character string (block S26). The condition generation unit 26 repeats block S20 until the processing of block S20 has been performed with respect to all converted character strings (block S26: No).

If determining that the processing of block S20 has been performed with respect to all converted character strings (block S26: Yes), the condition generation unit 26 generates the retrieval condition 34 (block S28). Here, the condition generation unit 26 determines "yuu-hatsu-sei" (induced) as a retrieval candidate and "yuu-hatsu-sei" (induced) and "ken-shin" (medical examination) as exclusion candidates. Therefore, the condition generation unit 26 generates the following expression (2) as the retrieval condition 34, where the symbols in the expression (2) are based on regular expressions:

Retrieval condition: (ga-n)^(yuu-hatsu-sei|ken-shin)  (2), wherein:
^ means that the preceding character does not match the characters in parentheses following this symbol; and
| means "or." In the above example, "yuu-hatsu-sei|ken-shin" means "yuu-hatsu-sei" or "ken-shin."

Therefore, the retrieval condition 34 of the expression (2) indicates that the character strings "ga-n-yuu-hatsu-sei" (cancer-induced) and "ga-n-ken-shin" (cancer medical examination) are excluded, among the character strings including "ga-n." Thereby, the condition generation unit 26 generates the retrieval condition 34 of matching the target character string and not matching the converted character string satisfying the condition of the expression (1). The condition generation unit 26 stores the generated retrieval condition 34 into the storage unit 18.

The condition generation unit 26 determines whether a user selects a candidate (block S30). For example, the condition generation unit 26 causes the display unit 14 to display the display image 40 illustrated in FIG. 4. In the display image 40, "ga-n" (cancer) in the center is a target character string. The character or character string displayed on the left side of "ga-n" (cancer) is a retrieval candidate or an exclusion candidate previous to "ga-n" (cancer). The character or character string displayed on the right side of "ga-n" (cancer) is a retrieval candidate or an exclusion candidate subsequent to "ga-n" (cancer). The check mark in a square on the left side of each character or character string indicates that the character or character string concerned is an exclusion candidate selected by the condition generation unit 26. The character or character string with no check mark in the square on the left side of the character or character string is a retrieval candidate set by the condition generation unit 26.

The user selects exclusion candidates by placing or removing a check mark for each character or character string via the input unit 16 while viewing the display image 40 concerned. Based on acquiring the selection of the exclusion candidates from the user (block S30: Yes), the condition generation unit 26 changes the retrieval condition 34 and stores the new retrieval condition 34 into the storage unit 18 (block S32). On the other hand, in the case of not acquiring any selection of the exclusion candidates (block S30: No), the condition generation unit 26 omits the execution of block S32. Thereby, the retrieval condition generation processing ends.

In the retrieval processing, the retrieval unit 28 retrieves a text on the basis of the retrieval condition 34 stored in the storage unit 18 (block S34). The retrieval unit 28 may acquire the retrieval condition 34 from the condition generation unit 26. For example, in the case of performing retrieval on the text corpus 32 illustrated in FIG. 5, the retrieval unit 28 extracts texts TX1 to TX6 including the target character string "ga-n" (cancer). Subsequently, the retrieval unit 28 excludes the texts TX5 and TX6 including "ga-n-yuu-hatsu-sei" (cancer-induced) and "ga-n-ken-shin" (cancer medical examination) to be exclusion targets, respectively. Thereby, the retrieval unit 28 eventually extracts the texts TX1 to TX4. Herewith, the retrieval processing ends. The retrieval processing does not need to be performed continuously with the retrieval condition generation processing, but may be performed separately.

As described in the above, in the information processing device 10, the condition generation unit 26 determines a retrieval candidate as an exclusion candidate in the case where the retrieval candidate is appended to a converted character string in which the percentage of the number of target character strings matching the converted character string and retrieved based on the language processing to the number of target character strings retrieved based on the language processing is equal to or less than the reference frequency. Thereby, the information processing device 10 is able to extract character strings which should be extracted among the character strings including the target character string with high accuracy.

For example, "ga-n-yuu-hatsu-sei" (cancer-induced) described in the above example of the embodiment is not a cancer represented by "ga-n," but another disease. Therefore, when the target character string is "ga-n" (cancer), the character string "ga-n-yuu-hatsu-sei" (cancer-induced) is not a character string which should be extracted. In this case, the condition generation unit 26 generates a retrieval condition 34 for excluding the converted character strings "ga-n-yuu-hatsu-sei" (cancer-induced) and "ga-n-ken-shin" (cancer medical examination) among the character strings including the target character string "ga-n" (cancer). Therefore, it is understood that the retrieval condition 34 can be used to exclude character strings which should not be extracted. In this manner, the information processing device 10 is able to generate a retrieval condition 34 for excluding character strings which should not be extracted among the character strings including the target character string so as to improve the extraction accuracy of the character strings.

Moreover, since the condition generation unit 26 generates the retrieval condition 34 of matching the target character string and not matching any one of the converted character strings, the information processing device 10 is able to extract a character string which is not extracted in the case where the first texts divided into words by the language processing are determined to be retrieval targets.

For example, in the case where "haku-nai-syou-syu-jutu" (cataract surgery) is retrieved as a target character string by language processing and where "migi-haku-nai-syou" (right cataract) and "syu-jutu" (surgery) are registered as words in the dictionary data 30, a character string "migi-haku-nai-syou-syu-jutu" (right cataract surgery) in a text is divided into words, "migi-haku-nai-syou" (right cataract) and "syu-jutu" (surgery), by which the character string "haku-nai-syou-syu-jutu" (cataract surgery) has not been extracted. On the other hand, the information processing device 10 extracts all character strings each including the target character string "haku-nai-syou-syu-jutu" (cataract surgery) by pattern matching on the basis of the retrieval condition 34. Therefore, the information processing device 10 is also able to extract the character string "migi-haku-nai-syou-syu-jutu" (right cataract surgery) as long as it does not correspond to an exclusion candidate. Moreover, in the case where the target character string is "ma-hi" (paralysis), a character string "hidari-bo-shi-ma-hi" (left thumb paralysis) in a text has not been extracted since it includes an unknown word "bo." This is because the character string "hidari-so-shi-ma-hi" (left thumb paralysis) includes the unknown word "bo" and therefore is recognized as an unknown word, by which the character string is not divided into words. On the other hand, the information processing device 10 extracts all character strings each including the target character string "ma-hi" (paralysis) once on the basis of the retrieval condition 34 and therefore is also able to extract "hidari-bo-shi-ma-hi" (left thumb paralysis) as long as it does not correspond to an exclusion candidate.

In the information processing device 10, the condition generation unit 26 is able to generate the retrieval condition 34 by using an existing dictionary data 30. Thereby, the information processing device 10 is able to constantly improve the accuracy of the retrieval condition 34 by updating the dictionary data 30.

In the information processing device 10, the condition generation unit 26 causes the display unit 14 to display the display image 40 which allows exclusion candidates to be selected. This enables the information processing device 10 to visualize the retrieval condition 34 so as to show the user what retrieval condition 34 is used for the retrieval.

The following describes an example where the aforementioned embodiment is varied.

Determination of Reference Frequency

An embodiment of the determination of the reference frequency in block S20 will be described. The condition generation unit 26 may make it condition that the ratio of the part which matches the converted character string and corresponds to the target character string among the words divided by the language processing in the first texts exceeds the reference frequency. Specifically, the condition generation unit 26 may determine whether the following expression (3) is satisfied.

$$Th < \#(Ra \cap Rx)/\#Rx \qquad (3)$$

The condition generation unit 26 may generate a retrieval condition 34 not including a restriction by the converted character string on condition that the expression (3) is satisfied. In the above embodiment, the converted character string "yuu-hatsu-sei-ga-n" (induced cancer) satisfies the expression (3) with respect to the target character string "ga-n" (cancer), and therefore the condition generation unit 26 generates a retrieval condition 34 not including the restriction by the converted character string "yuu-hatsu-sei-ga-n" (induced cancer), in other words, not excluding the converted character string "yuu-hatsu-sei-ga-n" (induced cancer).

The condition generation unit 26 may determine whether the expression (1) is satisfied on condition that the following expression (4) is satisfied:

$$Th < \#(Ra - Rx)/\#Rx \qquad (4)$$

In other words, the condition generation unit 26 may make it condition that the ratio of the part which matches the converted character string and does not correspond to the target character string among the words divided by the language processing in the first texts exceeds the reference frequency. In this case, the condition generation unit 26 generates a retrieval condition 34 of matching the target character string and not matching the converted character string which satisfies the condition of the expression (4).

Generation of Retrieval Condition

An embodiment of the generation of a retrieval condition 34 will be described. FIG. 6 is a diagram illustrating a text corpus including a third text used for the generation of a retrieval condition. In addition, the condition generation unit 26 may generate a retrieval condition 34 of matching the target character string and not matching the converted character string on condition that the converted character string does not have an attribute by determining whether the converted character string has the attribute on the basis of the frequency at which the converted character string matches at least one third text with which an attribute depending on the target character string is associated.

For example, the condition generation unit 26 learns whether the third text has an attribute depending on the target character string by logistic regression with the frequency at which the converted character string matches the third text as an explanatory variable and generates a retrieval condition 34 of matching the target character string and not matching the converted character string on condition that the explanatory variable has a negative correlation with that the converted character string has the attribute.

Specifically, assuming that the target character string is "ga-n" (cancer), the condition generation unit 26 generates the retrieval condition 34 on the basis of a third text TXm (m=11, --, 21, --, 31, --) of the text corpus 42 illustrated in FIG. 6. Here, an objective variable in a logistic regression analysis is assumed to be a probability of being the target of receiving the payment of insurance proceeds. In other words, the probability that the converted character string is considered as "ga-n" (cancer) is assumed to be an objective variable. In the case of being the target of receiving the payment of insurance proceeds, the objective variable is 1. In the case of not being the target of receiving the payment of insurance proceeds, the objective variable is 0. Assuming that the objective variable is p and the explanatory variable of each converted character string is Xn (n=1, 2, --), the relationship between p and Xn is represented by the following expression (5):

$$\log(p) = \alpha + \beta_1 X_1 + \beta_2 X_2 + \beta_3 X_3 \qquad (5)$$

For example, "yuu-hatsu-sei-ga-n" (induced cancer) accounts for 80% in all characters in the text TX11, the condition generation unit 26 sets the explanatory variable $X_1$ of "yuu-hatsu-sei-ga-n" (induced cancer) in the text TX11 to 80%. Moreover, if the text TX11 is a text which is the target of receiving the payment of insurance proceeds, the condition generation unit 26 sets the objective variable of the text TX11 to 1. Similarly, with respect to other texts TX21 and TX31, the condition generation unit 26 calculates the percentage of "ga-n-yuu-hatsu-sei" (cancer-induced) or "ga-n-ken-shin" (cancer medical examination) in the text TX21 or TX31 and calculates the explanatory variable $X_2$ or $X_3$ of "ga-n-yuu-hatsu-sei" (cancer-induced) or "ga-n-ken-shin" (cancer medical examination). Incidentally, the texts TX21 and TX31 are not the targets of receiving the payment of insurance proceeds and therefore the objective variable is set to 0. In this manner, the condition generation unit 26 finds a plurality of combinations of an explanatory variable and an objective variable and estimates a coefficient α of each explanatory variable illustrated in expression (1) and a coefficient βn associated with each converted character string by using the maximum likelihood method which is the estimation method of the known logistic regression analysis. If the coefficient βn is positive, the condition generation unit 26 determines that the attribute of the converted character string is positive. On the other hand, if the coefficient βn is negative, the condition generation unit 26 determines that the attribute of the converted character string is negative. The condition generation unit 26 generates the retrieval condition 34 of matching the target character string and not matching the negative converted character string in the attribute on the basis of these determination results.

Generation of Converted Character String

The following describes an embodiment of the generation of the converted character string in block S12. The character conversion unit 24 may generate a converted character string on the basis of a character string included in a text, instead of words in the dictionary data 30. For example, the character conversion unit 24 may generate a converted character string by retrieving a target character string in the second text which is the same as or different from the first text and appending at least one character located in at least either one of the previous and subsequent positions of the retrieved target character string to the target character string. In this case, the character conversion unit 24 may generate the converted character string by appending at least one character common to the reference number Stb or more of parts in the second text to the target character string. For example, in the case where the target character string is "ga-n" (cancer), the character conversion unit 24 retrieves "ga-n" (cancer) in the second text and adds characters one by one in at least either one of the previous and subsequent positions of "ga-n" (cancer). The character conversion unit 24 determines the longest character string to be a converted character string among the character strings in the case where there are the reference number Stb or more of parts which are the same as the character string with characters added to "ga-n" (cancer).

The character conversion unit 24 may generate a plurality of converted character strings by appending at least one character for each of the plurality of converted character strings corresponding to a plurality of inflectional forms with respect to the target character string of an inflectional word. For example, the character conversion unit 24 generates converted character strings by appending at least one character of a retrieval candidate to the inflectional forms of the target character string.

While the character conversion unit 24 has generated the converted character strings if the number of character strings each including a target character string is greater than or equal to the reference number of words Sta, or greater than or equal to the reference number Stb in the above embodiment, the generation of converted character strings is not limited thereto. For example, the character conversion unit 24 may consider all character strings each including a target character string to be converted character strings. Specifically, the character conversion unit 24 may set the reference number of words Sta and the reference number Stb to 1.

In some embodiments, while the character conversion unit 24 has extracted retrieval candidates on the basis of the dictionary data 30 or the text corpus 32 in the above embodiment, the retrieval candidates are not limited thereto. For example, the character conversion unit 24 may extract retrieval candidates from character sets each including an arbitrary katakana character. Moreover, the character conversion unit 24 may extract retrieval candidates from character string patterns such as Chinese numerals.

The character conversion unit 24 may replace at least one character of a target character string. For example, if the target character string is an English word, the character conversion unit 24 may replace one or more characters of the target character string. Specifically, the character conversion unit 24 may generate a converted character string by replacing "virus" with "viral". Moreover, the character conversion unit 24 may generate a converted character string by performing at least one of appending and replacement or may generate a converted character string by performing both of appending and replacement. In other words, the character conversion unit 24 may perform at least one of appending at least one character in at least either one of the previous and subsequent positions of the target character string and replacing at least one character of the target character string.

Figure 7:
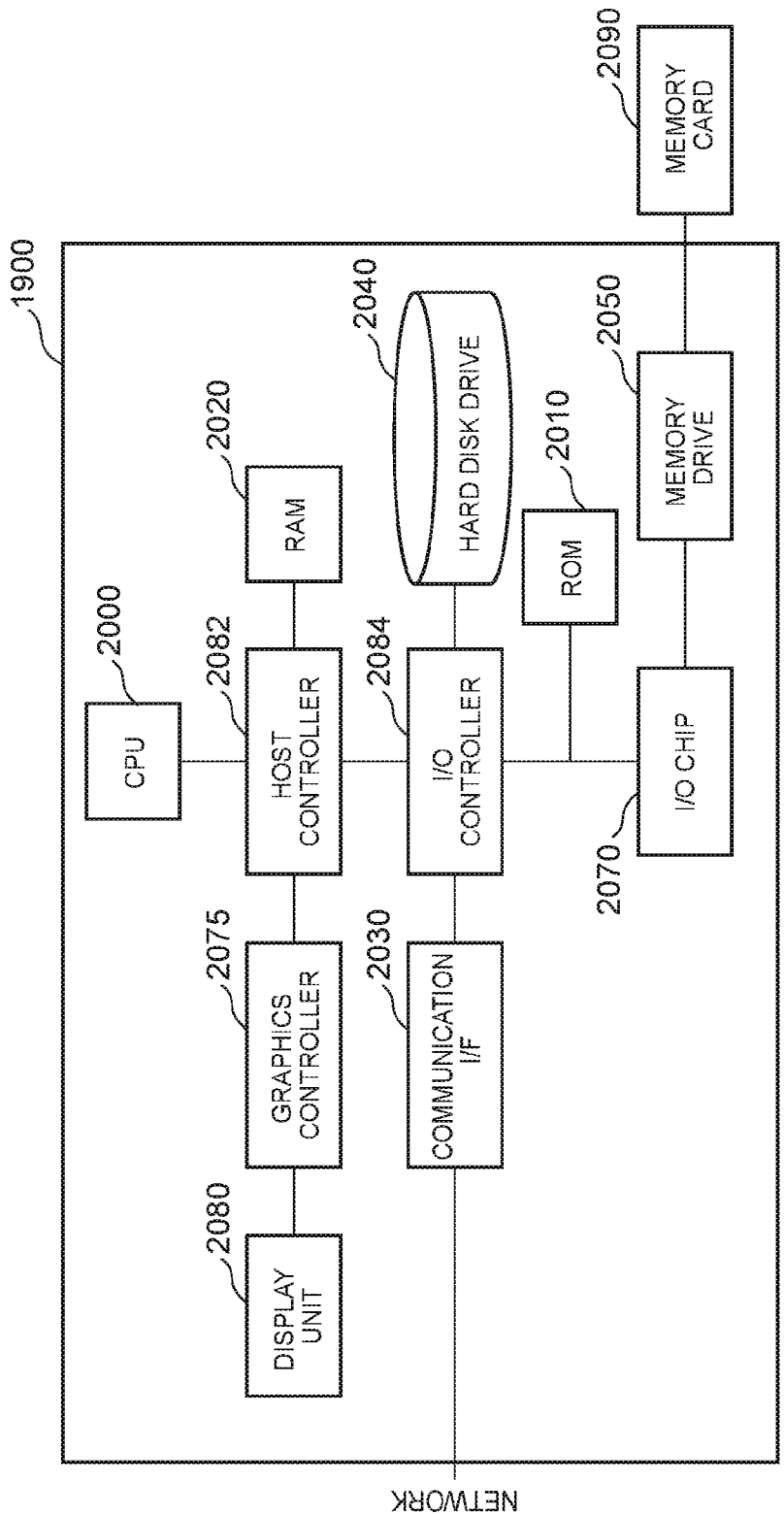
FIG. 7 illustrates an embodiment of a hardware configuration of a computer.

FIG. 7 illustrates an example of a hardware configuration of a computer 1900 according to this embodiment. The computer 1900 according to this embodiment is an example of the information processing device 10. The computer 1900 includes a CPU peripheral unit, an input/output unit, and a legacy input/output unit. The CPU peripheral unit includes a CPU 2000, a RAM 2020, and a graphics controller 2075, all of which are mutually connected to one another via a host controller 2082. The CPU peripheral unit also includes a display unit 2080. The input/output unit includes a communication interface 2030 and a hard disk drive 2040, both of which are connected to the host controller 2082 via an input/output controller 2084. The legacy input/output unit includes a ROM 2010, a memory drive 2050, and an input/output chip 2070, all of which are connected to the input/output controller 2084.

The host controller 2082 mutually connects the RAM 2020 to the CPU 2000 and the graphics controller 2075, both of which access the RAM 2020 at a high transfer rate. The CPU 2000 operates according to a program stored in the ROM 2010 and the RAM 2020, and controls each of the components. The graphics controller 2075 obtains image data generated by the CPU 2000 or the like in a frame buffer provided in the RAM 2020, and causes the display unit 2080 to display the obtained image data. In place of this, the graphics controller 2075 may internally include a frame buffer in which the image data generated by the CPU 2000 or the like is stored.

The input/output controller 2084 connects the host controller 2082 to the communication interface 2030 and the hard disk drive 2040, both of which are relatively high-speed input/output devices. The communication interface 2030 communicates with another device via a network. The hard disk drive 2040 stores, therein, a program such as a display program and data to be used by the CPU 2000 in the computer 1900.

In addition, the input/output controller 2084 is connected to relatively low-speed input/output devices such as the ROM 2010, the memory drive 2050, and the input/output chip 2070. The ROM 2010 stores a program such as a boot program executed at a start-up time of the computer 1900 and/or a program depending on hardware of the computer 1900 or the like. The memory drive 2050 reads a program or data such as, for example, a display program from a memory card 2090, and provides the read program or data to the hard disk drive 2040 via the RAM 2020. The input/output chip 2070 connects the memory drive 2050 to the input/output controller 2084 and also connects various kinds of input/output devices to the input/output controller 2084 through a parallel port, a serial port, a keyboard port, a mouse port, and the like, for example.

A program to be provided to the hard disk drive 2040 via the RAM 2020 is provided by a user with the program stored in a recording medium such as the memory card 2090 or an IC card. The program such as a display program is read from the recording medium, then installed into the hard disk drive 2040 in the computer 1900 via the RAM 2020 and executed by the CPU 2000.

The program to be installed in the computer 1900 and to cause the computer 1900 to function as the information processing device 10 includes a language processing module, a character conversion module, a condition generation module, and a retrieval module. Such program or modules works on the CPU 2000 to cause the computer 1900 to function as the language processing module, a character conversion module, a condition generation module, and a retrieval module.

Information processing written in these programs are read by the computer 1900 and thereby function as a language processing module, a character conversion module, a condition generation module, and a retrieval module, all of which are specific means resulting from cooperation of software and the aforementioned various types of hardware resources. Moreover, the information processing device 10 specific to an intended purpose is built up by performing computation or processing for information in accordance with the intended purpose of the computer 1900 in this embodiment by use of such specific means.

In a case where communications are performed between the computer 1900 and an external device, for example, the CPU 2000 executes a communication program loaded on the RAM 2020 and instructs the communication interface 2030 on the basis of processing contents described in the communication program to perform communication processing. Upon receiving the control from the CPU 2000, the communication interface 2030 reads out transmission data stored in a transmission buffer region or the like provided in a storage device such as the RAM 2020, the hard disk drive 2040, the memory card 2090, or the like and then transmits the data to a network or writes reception data received from the network into a receiving buffer region or the like provided on the storage device. As described above, the communication interface 2030 is allowed to transfer transmission and reception data between itself and a storage device by a direct memory access (DMA) scheme. Instead of this, the CPU 2000 is also allowed to read data from a storage device of or a communication interface 2030 of a transfer source and then to transfer the transmission and reception data by writing the data into a communication interface 2030 or a storage device of a transfer destination.

In addition, the CPU 2000 causes all of, or a required portion of, data to be read from a file or a database stored in an external storage device such as the hard disk drive 2040, the memory drive 2050 (the memory card 2090) or the like into the RAM 2020 by DMA transfer or the like, and then performs various kinds of processing for the data in the RAM 2020. Then, the CPU 2000 writes the processed data back into the external storage device by DMA transfer or the like. In such processing, since the RAM 2020 can be considered as a device in which contents of the external storage device are stored temporarily, the RAM 2020 and the external storage device or the like are collectively termed as a memory, a storage unit, a storage device, or the like in this embodiment. Various types of information including various types of programs, data, tables, databases and the like in this embodiment is stored in such a storage device and is handled as an information processing target. It should be noted that the CPU 2000 is allowed to retain a part of data in the RAM 2020 in a cache memory and then to read and write the data in the cache memory. In this case as well, since the cache memory partially shares the function of RAM 2020, the cache memory is considered to be included in the RAM 2020, a memory and/or a storage device except for a case where the cache memory needs to be distinguished from the RAM 2020, a memory and/or a storage device.

In addition, the CPU 2000 performs, on the data read from the RAM 2020, various types of processing being specified by a sequence of instructions of the program and including various types of computations, information processing, conditional judgment, information retrieval and replacement and the like described in this embodiment, and writes the processed data back into the RAM 2020. In a case where the CPU 2000 performs conditional judgment, for example, the CPU 2000 determines, by comparing a variable with the other variable or constant, whether or not each of various types of variables indicated in the present embodiment satisfies a condition whether or not the variable is larger, smaller, not less, not greater, equal or the like. In a case where the condition is satisfied (or the condition is not satisfied), the processing of the CPU 2000 branches to a different instruction sequence or calls a subroutine. In addition, the CPU 2000 may retrieve information stored in a file, a database, or the like in the storage device.

The programs or modules described above may be stored in an external recording medium. As the recording medium, any one of the following media may be used: an optical recording medium such as a DVD or a CD; a magneto-optic recording medium such as an MO; a tape medium; and a semiconductor memory such as an IC card, in addition to the memory card 2090. Alternatively, the program may be provided to the computer 1900 via a network, by using, as a recording medium, a storage device such as a hard disk or a RAM provided in a server system connected to a private communication network or the Internet.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of the present invention.

What is claimed is:

1. A computer-implemented method for generating a retrieval condition for retrieving a target character string from texts by pattern matching, the method comprising:
   dividing, by a processor, a first text into words;
   generating a converted character string by performing at least one of appending at least one character in at least either one of previous and subsequent positions of the target character string;
   replacing at least one character of the target character string; and
   generating the retrieval condition for retrieval candidates in the words of the first text, wherein the retrieval condition improves extraction accuracy of the target character string by determining that a retrieval candidate is an exclusion candidate based on the retrieval candidate being appended to the converted character string, and the retrieval candidate matching the target character string and not matching the converted character string based on a ratio of a part of the retrieval candidate which matches the converted character string and corresponds to the target character string is less than or equal to a reference frequency;

retrieving the target character string based on the retrieval condition;

determining whether a second text has an attribute that depends from the target character string by using logistic regression to identify a frequency at which the converted character string matches the second text as an explanatory variable, wherein the explanatory variable is part of the first text, and wherein the retrieval condition of matching the target character string and not matching the converted character string is generated based on the explanatory variable having a negative correlation with the converted character string that has the attribute.

* * * * *